(12) United States Patent
Fitz et al.

(10) Patent No.: US 6,459,837 B1
(45) Date of Patent: *Oct. 1, 2002

(54) OPTICAL FIBER CABLE WITH SINGLE STRENGTH MEMBER UNIT IN CABLE OUTER JACKET

(75) Inventors: Jon Fitz, West Columbia, SC (US); Ben Wells, Irmo, SC (US); Jin Liu, Irmo, SC (US); John Smith, Columbia, SC (US)

(73) Assignee: Pirelli Cables and Systems LLC, Columbia, SC (US)

( * ) Notice: Subject to any disclaimer, the term of this patent is extended or adjusted under 35 U.S.C. 154(b) by 60 days.

This patent is subject to a terminal disclaimer.

(21) Appl. No.: 09/600,652
(22) PCT Filed: Jul. 20, 2000
(86) PCT No.: PCT/US00/19766
§ 371 (c)(1),
(2), (4) Date: Jul. 28, 2000
(87) PCT Pub. No.: WO01/07953
PCT Pub. Date: Feb. 1, 2001

(51) Int. Cl.[7] .................................................. G02B 6/44
(52) U.S. Cl. ...................................................... 385/113
(58) Field of Search ................................ 385/102–103, 385/113

(56) References Cited

U.S. PATENT DOCUMENTS

| | | | |
|---|---|---|---|
| 4,097,119 A | 6/1978 | Kuamaru et al. | 385/103 X |
| 4,798,443 A | 1/1989 | Knipe et al. | 385/113 X |
| 4,836,639 A | 6/1989 | Shamoto et al. | 385/113 X |
| 4,844,575 A | 7/1989 | Kinard et al. | 385/113 X |
| 4,909,592 A | * 3/1990 | Arroyo et al. | 350/96.23 |
| 5,095,176 A | 3/1992 | Harbrecht et al. | 385/113 X |
| 5,125,063 A | 6/1992 | Panuska et al. | 385/113 |
| 5,448,670 A | 9/1995 | Blew et al. | 385/112 |
| 5,960,144 A | * 9/1999 | Klumps et al. | 385/113 |
| 5,982,966 A | 11/1999 | Bonicel | 385/100 |
| 6,052,501 A | * 4/2000 | Jamet | 385/102 |
| 6,137,936 A | * 10/2000 | Fitx et al. | 385/113 |
| 6,259,844 B1 | * 7/2001 | Logan et al. | 385/113 |
| 6,377,737 B1 | * 4/2002 | Sheu | 385/102 |
| 6,377,738 B1 | * 4/2002 | Anderson et al. | 385/113 |

FOREIGN PATENT DOCUMENTS

| | | | |
|---|---|---|---|
| EP | 0849617 | 6/1998 | 385/113 X |
| WO | 9615466 | 5/1996 | 385/113 X |

* cited by examiner

Primary Examiner—Akm E. Ullah
Assistant Examiner—Jerry T Rahll
(74) Attorney, Agent, or Firm—L. P. Brooks, Esq.; Norris, Mc Laughlin & Marcus (57) ABSTRACT

An optical fiber cable has a core with a bore which loosely contains optical fibers and includes a single strength member unit preferably embedded in an outer jacket which surrounds the core. The single strength member unit allows for relative ease of bending of the cable in directions other than the bending directions in the plane of minimum bending energy for the cable, such as bending in the plane of maximum bending energy (MAX-BP) for the cable, and provides that the neutral surface associated with bending of the cable in the MAX-BP is outside the bore core and within the outer jacket. The single strength member unit, which is at least one strength member, furthermore provides tensile strength and antibuckling properties to the cable during storage and in expected installations, including an aerial installation. The outer jacket is releasably coupled to the core to provide ease of access to the optical fibers contained within the core bore.

59 Claims, 5 Drawing Sheets

OPTICAL FIBER CABLE WITH SINGLE STRENGTH MEMBER UNIT IN CABLE OUTER JACKET

FIELD OF THE INVENTION

The present invention relates to an optical fiber cable, and more particularly, an optical fiber cable having a core with a bore in which at least one optical fiber is loosely contained and including a single strength member unit in an outer jacket around the core which provides both tensile strength and an aerial suspension means. The cable has a neutral surface associated with bending of the cable in a plane of maximum bending energy which is located within the outer jacket and outside the core bore.

BACKGROUND OF THE INVENTION

Optical fiber is now used in a variety of telecommunication applications because of its small physical size and high bandwidth capacity. An optical fiber cable typically contains many optical fibers. The optical fibers can be contained in the cable in a variety of configurations, such as, for example, in an optical fiber ribbon, as a fiber strand or loosely enclosed in a buffer tube.

An optical fiber is a mechanically fragile structure. The optical signal transmission characteristics of an optical fiber can substantially degrade if the fiber is mechanically stressed. If a fiber is too severely mechanically stressed, the fiber can become non-functional for purposes of optical signal transmission in a telecommunication application.

It is not uncommon that an optical fiber cable containing an optical fiber or optical fibers will undergo handling or be exposed to a physical environment that can stress the fiber or fibers within the cable. For example, an optical fiber contained in an optical fiber cable can experience stress and strain when the cable is bent or stretched during winding on a reel for purposes of storage, or during or after installation along and over another surface, in a pipe or duct or suspended in air from vertical supports. Also, the fiber in a cable can be mechanically stressed if it is pinched between other cable components and because of the difference between the coefficients of thermal expansion for the optical fiber and the other components in the optical fiber cable containing the fiber.

When an optical fiber cable is bent, bending occurs along a neutral surface plane which is associated with the cable bending and extends along the longitudinal length of the cable. The intersection of the neutral surface plane with a cross-section of the cable is a neutral axis.

If an optical fiber cable is of uniform construction in all directions radially of its axis, the cable has the same rigidity, e.g., resistance to bending, in all directions transverse to the axis. However, if there are discrete components, such as strength members in portions of the cable, there are two preferred directions of bending in a preferred plane of bending or there may be more than one direction of bending in which the cable can be bent more easily than in other directions. Thus, there can be a longitudinal plane (MIN-BP) intersecting the cable in which minimum bending energy is required to bend the cable. As viewed in cross-section, a neutral axis called "$NA_{Min}$" is associated with the bending of the cable in the MIN-BP, and $NA_{Min}$ is perpendicular to the MIN-BP and may intersect the cable axis. With such structure there is another such plane (MAX-BP) in which maximum bending energy is required to bend the cable, and there is a similar neutral axis called "$NA_{Max}$" which is associated with the bending of the cable in the MAX-BP and is perpendicular to the MAX-BP but may not intersect the geometric center of the cable.

When a radially non-uniform optical fiber cable is subjected to bending forces, the cable will seek to orient and twist itself to cause bending to occur in the plane for which a minimum of energy is required to bend the cable, i.e., the MIN-BP. When a cable is bent in a particular plane, the material of the cable at opposite sides of the neutral surface plane associated with the plane of bending is respectively compressed and concave, and stretched and convex and in tension. During bending of the cable, any component in the cable which is free to shift radially of the cable, such as an optical fiber loosely received in the bore of the core, tends to migrate from the portion of the cable under tension or compression to the portion where strain is minimized. The cross-sectional area in the cable within which any loosely held fiber can move, the length of the fiber in relation to the cable and the plane in which the cable is bent determine the location in the cable where the fiber will become positioned as a result of the bending of the cable. If, during bending of a cable, a loosely held fiber within the cable becomes positioned away from the neutral surface associated with the bending of the cable, elongation or contraction stress can be applied to the optical fiber if other expedients are not employed. Although it is desirable that any loosely held fiber in the cable is positioned on or near the neutral surface associated with the expected bending of the cable, which in many circumstances will be in the MIN-BP, it is possible to reduce or eliminate such stress by suitably selecting the size of the bore and the excess of the fiber length with respect to the rectilinear length of the bore axis (EFL).

Prior art optical fiber cables have been designed to include features which control the behavior of the cable when subjected to bending and control the location of the neutral surface in bending to limit the stress on fibers in the cable. For example, the optical fiber cable of U.S. Pat. No. 4,844,575, incorporated by reference herein, includes two diametrically opposing strength members in the cable jacket to provide the cable with a MIN-BP having an associated neutral surface which intersects the center of the cable and the centers of the opposing strength members. Such cable can be bent most easily in either of two directions.

In addition, U.S. Pat. No. 4,836,639, incorporated by reference herein, discusses the problems of winding and unwinding a pipe or tube containing optical fibers around a drum and discloses an optical fiber cable which includes one or more strength members within the tube wall and optical fibers which assume positions at the inner wall of the jacket of the cable. The strength member(s) of the cable and the tube wall of the '639 patent position the neutral surface associated with bending of the cable in the MIN-BP near or coextensive with the position of the fibers in the cable with bending and so that when the tube is wound on a drum, the strength member or members are nearer the drum axis than the fibers, i.e., radially inwardly of the fiber. While the solution of the '639 patent can be useful when the tube is wound on a drum, the solution is not satisfactory when the tube is used in other applications, e.g., aerial applications, or when the optical fibers are within a core comprising elements, such as a buffer tube, strength members, armoring, etc., which is surrounded by the tube of the '639 patent as an outer jacket. Thus, in aerial applications the strength member is above the optical fibers, the loose optical fibers do not move significantly toward the strength member or the neutral axis described in the '639 patent.

Although the '639 patent indicates that only one reinforcing wire can be used, the '639 patent also indicates that the number of reinforcing wires should be greater than one in order to insure that the cable is wound around a drum in the intended direction. In fact, if only one reinforcing wire were used, the patent does not indicate how a preferred direction of bending would be obtained.

The inclusion multiple strength members within a cable jacket can be disadvantageous for several reasons. First, the arrangement of a plurality of strength members in the cable jacket can make the cable extremely stiff. An overly stiff cable makes handling and maneuverability of the cable difficult because substantial energy would be required to bend the cable in a plane other than the MIN-BP with a minimum of twisting, which often is desirable and required during and after installation of the cable. Also, the inclusion of multiple strength members in the jacket greatly can increase the cable weight and the size of the cable in diameter and bulk to cause other undesirable inefficiencies. Further, the manufacturing step of extruding plastic over multiple strength members to obtain a desired jacket structure can be complex and difficult. Finally, it can be more difficult to secure aerial hardware to multiple strength members than to a single strength member in an aerial installation of a cable.

There are prior art cables suitable for aerial installation, see, for example, U.S. Pat. Nos. 4,097,119 and 5,095,176, incorporated by reference herein, which include metallic messenger wires which are connected to the main body of the cable by a thin web of jacket material and which can be used to suspend the cable securely from vertical supports. In this cable design, an additional longitudinal strength member, such as a reinforced rod or a metal sheath bonded to the jacket, is required in the core of the cable, because the messenger wires are not sufficiently coupled to the layers around the optical fiber to provide the cable itself with sufficient pulling and anti-compression resistance to minimize stress on the fibers in the aerial installation of the cable. In other words, the messenger wires do not provide a dual function of cable suspension and stress resistance. Also, the inclusion of strength members in the core or bonding of a metal sheath to the jacket can make the cable undesirably stiff.

Other optical fiber cables suitable for aerial installation, see, U.S. Pat. Nos. 5,125,063 and 5,448,670, incorporated by reference herein, include two diametrically opposed strength members embedded in a jacket which encloses a central tube loosely surrounding optical fibers. In an aerial installation, these cables are either clamped directly to a vertical support, or to a separate and independent messenger wire which extends along a series of vertical supports and which connects to and carries the weight of the installed cable. Such a cable design is inefficient because two strength members are required and because of the disadvantages described hereinbefore.

Similarly, the optical cable suitable for aerial installation described in U.S. Pat. No. 4,798,443, incorporated by reference herein, which includes a plurality of non-metallic reinforcing members embedded in the jacket and extending generally parallel to the axis of the cable, and which cable can be clamped directly to the vertical supports in an aerial installation, has some of the same disadvantages associated with the cables of the '670 and '063 patents. Although the '443 cable design provides for a plurality of optical elements to minimize strain on the fibers in installation, where each optical element comprises several buffer tubes loosely carrying individual fibers and disposed around a non-metallic central member, this design may be more difficult and expensive to manufacture and access to the fibers at midspan of the cable is also more difficult.

Therefore, there exists a need for an optical fiber cable which is compact, has a small diameter, is lightweight, efficiently protects fibers loosely contained therein from mechanical stress in an aerial installation of the cable, which not only provides a preferred bending plane, i.e., the MIN-BP, but also allows for relative ease of bending of the cable in a plane other than the MIN-BP as compared to prior art cables and provides preferred directions of bending with respect to the MAX-BP.

SUMMARY OF THE INVENTION

In accordance with the present invention, an optical fiber cable includes a single strength member unit comprising a single strength member or a plurality of strength members within, and preferably embedded in, an outer jacket which encircles at least one loosely held optical fiber.

Preferably, the jacket encircles a core with at least a buffer tube having a bore in which a plurality of optical fibers are loosely contained, i.e., the cross-sectional area of the bore is greater than the cross-sectional area of the fiber or fibers. Also, preferably, the fibers have excess fiber length (EFL). The size of the bore and the EFL are selected so that the optical fibers are not stressed by any normal forces not absorbed by the strength member(s) in the single strength member unit.

Preferably, the outer surface of the jacket conforms to the surface of a cylinder and the outer surface of the core also conforms to the surface of a cylinder but the axis of the core is displaced with respect to the axis of the jacket in the direction away from the single strength member unit with the axis of the core and the axis of the jacket in the same plane. Preferably, the longitudinal axis of the single strength member unit also is in said same plane.

A plane of minimum bending energy (MIN-BP) for the cable is defined mainly by the physical properties and position of the single strength member unit but is also affected by the cross-sectional shaping of the jacket. Such shaping and the physical properties and position of the single strength member unit also define a plane of maximum bending energy (MAX-BP) perpendicular to the MIN-BP for the cable. The properties and position of the single strength member unit and the shaping of the outer jacket are selected so that the neutral surface plane associated with bending in the MIN-BP is the same as the plane in which the axes of the single strength member unit, the jacket and the bore lie.

In a preferred embodiment, the neutral surface plane associated with bending of the cable in the MIN-BP intersects the bore of the core and the centroid of the single strength member unit. The neutral surface associated with bending of the cable in the MAX-BP is within the jacket and outside of the bore of the core. However, the cable can be bent with less force than in the prior art in planes other than the MIN-BP, including the MAX-BP, and the single strength member unit provides the cable with tensile stiffness and antibuckling properties.

In a further preferred embodiment, the physical properties and position of the single strength member unit in the outer jacket and the shaping of the outer jacket provide that the neutral surface associated with bending of the cable in the MIN-BP intersects the geometric center of the cable and the geometric center of the single strength member unit. Further, the neutral surface associated with bending of the cable in the MAX-BP is orthogonal to the neutral surface associated with the MIN-BP. With such structure, the optical fiber, or the optical fibers, are at or close to a neutral axis ($NA_{Min}$) when the cable is bent in the MIN-BP and bending of the cable in other directions encounters greater resistance.

The at least one loosely held fiber has an EFL, and the EFL and the ratio of the bore cross-sectional area to the cross-sectional area of the fiber or fibers are selected so that stress on the fiber or fibers is minimized when the cable is bent in the MAX-BP.

In a preferred embodiment, the core of the cable itself constitutes an independent and self-contained optical fiber cable which can be used without the outer jacket. The core preferably includes a central buffer tube with a bore and the tube loosely holds optical fiber ribbons in a stack arrangement.

In a further embodiment, the core in the cable includes at least one strength layer, such as an armor layer, one or more rigid dielectric strength members or a reinforced aramid yarn layer. The strength layer is disposed between the buffer tube and a core jacket. The core jacket is encircled by the outer jacket with the embedded strength member, which provides tensile stiffness and antibuckling properties to the core and to the cable while allowing the cable to be bent in the MAX-BP more easily than in the prior art.

In still another embodiment, a release coating layer is disposed between the inner surface of the outer jacket of the cable and the outer surface of a core jacket. The release layer releasably couples the outer jacket of the cable to the core, which includes the loose fibers, to provide for easy access to the fibers within the core.

In another aspect of the invention, the cable with the single strength member unit in the jacket is adapted to be installed aerially. In an aerial installation, portions of the single strength member unit within the outer jacket are exposed at intervals along the length of the cable and the exposed portions are secured to respective vertical supports. The single strength member unit in such aerial installation of the cable can support the entire weight of the cable and provide the core and the cable with tensile strength and antibuckling properties between the exposed portions while permitting the cable to bend with relative ease in the direction of the suspension curve between the supports.

BRIEF DESCRIPTION OF THE DRAWINGS

Other objects and advantages of the present invention will be apparent from the following detailed description of the presently preferred embodiments, which description should be considered in conjunction with the accompanying drawings in which.

DETAILED DESCRIPTION OF PREFERRED EMBODIMENTS

The invention is illustrated below in connection with an optical fiber cable which includes a core with a buffer tube which loosely receives a stack of optical fiber ribbons in the bore of the core. The outer jacket of the cable has a single strength member unit contained, and preferably embedded, therein which provides that the neutral surface associated with bending of the cable in the plane of maximum bending energy is outside the bore of the core, within the outer jacket and orthogonal to the neutral surface associated with bending of the cable in the plane of minimum bending energy. It is to be understood, however, that the present inventive technique is applicable to an optical fiber cable which loosely contains at least one optical fiber arranged in another configuration in the core.

Figure 1:
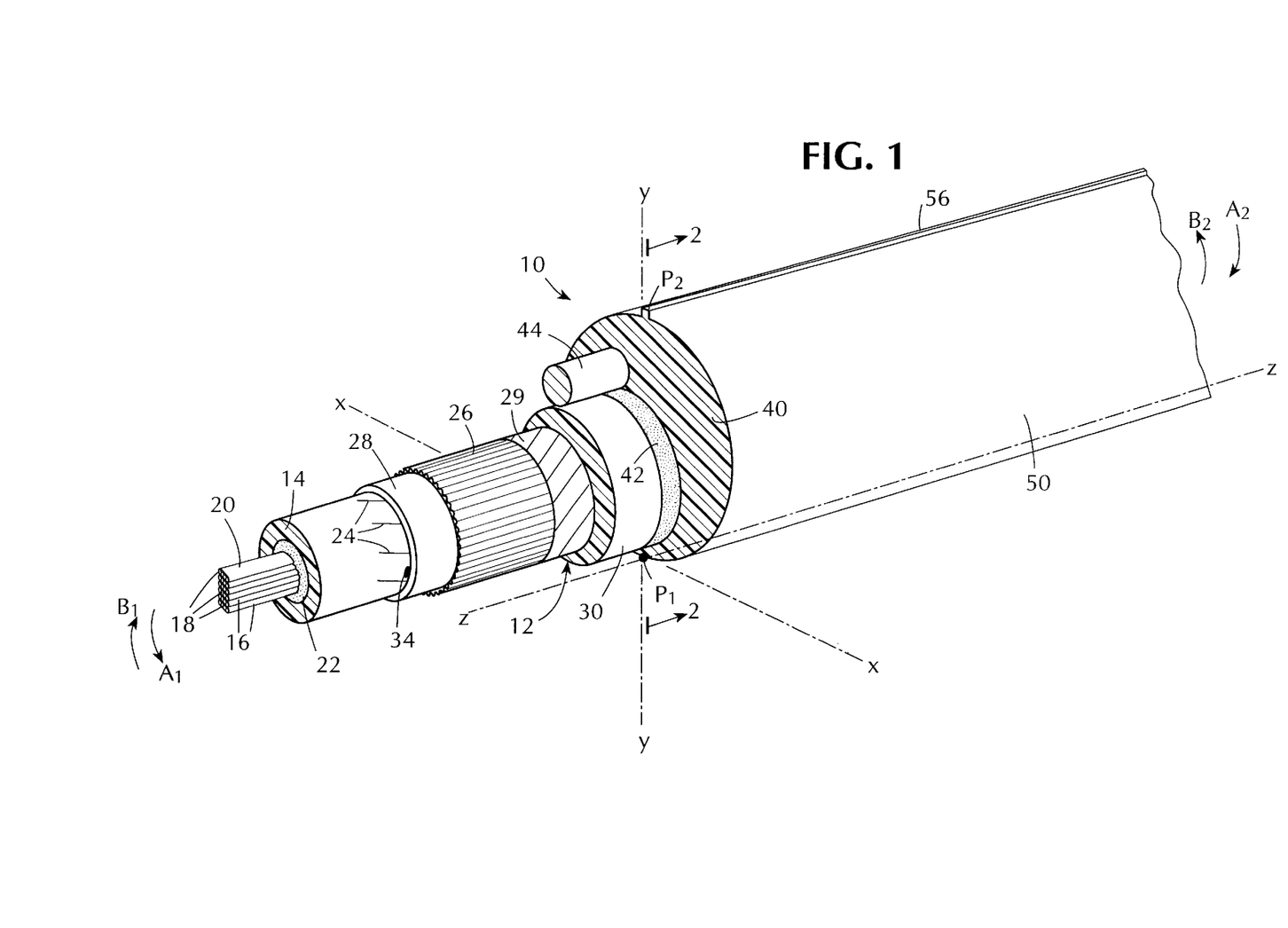
FIG. 1 is a perspective view of an optical fiber cable including a single strength member in the outer jacket in accordance with the present invention.

FIG. 1 illustrates a preferred embodiment of an optical fiber cable 10 in accordance with the present invention. For clarity and ease of reference in describing the inventive features of the cable 10, the cable 10 is shown in FIG. 1 with reference to mutually orthogonal x, y and z axes. As shown in FIG. 1, the cable 10 extends straight and lengthwise along and parallel to the z axis and the cross-section of the cable 10 lies in a plane defined by the intersection of the x and y axes.

Figure 2:
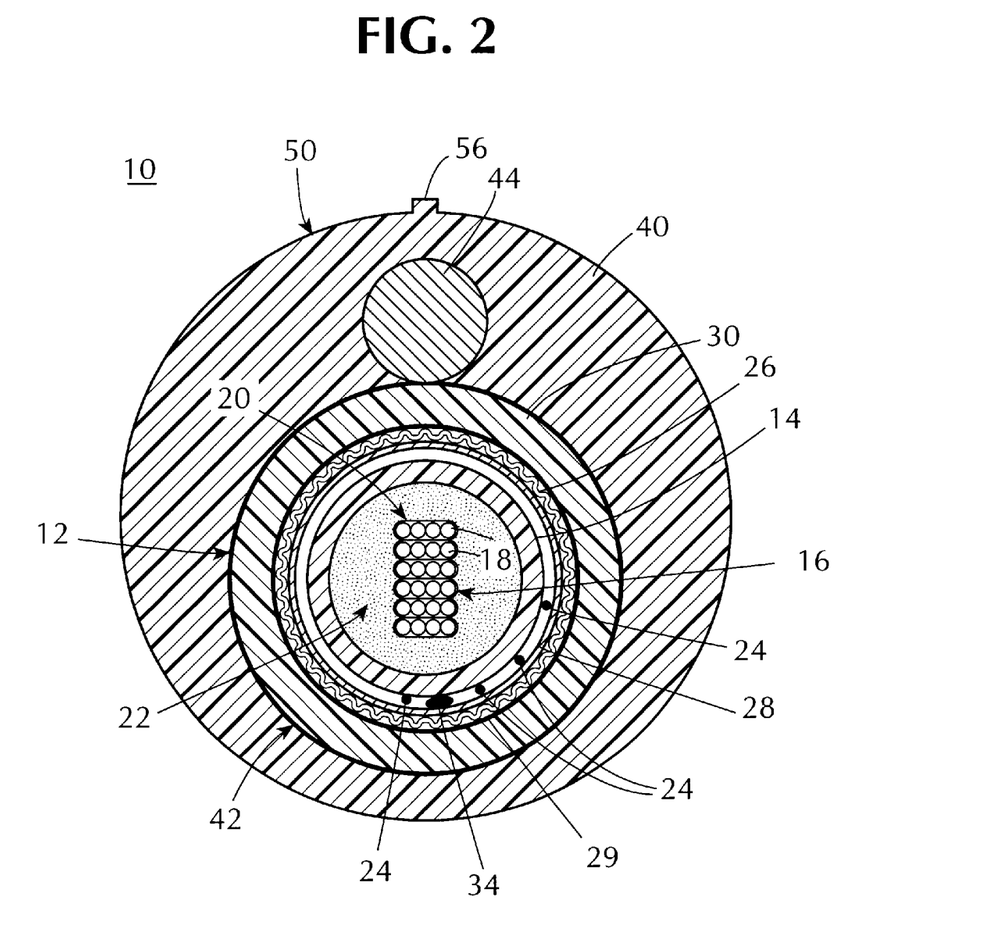
FIG. 2 is a cross-sectional view of the cable of FIG. 1 taken along the line 2—2 in FIG. 1.

Referring to FIG. 1 and to FIG. 2, the latter of which shows a cross-sectional view of the cable 10 taken along the line 2—2 in FIG. 1, the cable 10 includes an inner core 12 which constitutes a separate, independent, self-contained and complete optical fiber cable which can be used without more. The core 12 comprises a hollow central buffer tube 14. The tube 14 is made from an engineering thermoplastic having excellent crush resistance, tensile strength, flexibility and chemical resistance, as is known in the art. The crush resistance of the buffer tube 14 protects optical transmission media in the core 12, which are usually contained within the tube 14, from being damaged by external forces, such as by pinching of the cable 10 between two external elements. The tube 14, preferably, is formed from a polyester material, and most preferably from a polybutylene terapthalate (PBT) resin or polypropylene, and alternatively from medium density or high density polyethylene.

In a preferred embodiment, the tube 14 in the core 12 has a Young's modulus of about 300–2500 MPa, an outside diameter of about 4.00–5.50 mm, and preferably 5.20 mm, and an inside diameter of about 3.00–4.50 mm, and preferably 4.20 mm.

The tube 14 contains six optical fiber ribbons 16 in a stack arrangement. Each ribbon 16 includes four optical fibers 18 arranged in co-planar side-by-side relation. The four fibers 18 in each ribbon 16 are enclosed by an ultraviolet (UV) cured common coating 20. The core 12, thus, includes twenty-four optical fibers 18. Preferably, the fibers 18 in the outer corners of the stack arrangement have MAC values less than about 7.0. The opposing major surfaces of each of the ribbons 16 are, preferably, each about 1.20 mm wide. The thickness of each of the ribbons, or the distance between the opposing major surfaces of each of the ribbons, preferably is about 0.37 mm. The fibers 18 are single or multi-mode optical fibers, are color coded by UV curable ink for identification purposes and have a diameter of about 0.25 mm.

The stack of the fiber ribbons 16 is loosely received in the buffer tube 14 according to a loose buffer tube design. Empty spaces within the buffer tube 14, which the fiber ribbons 16 do not occupy, are filled with a thixotropic PAO based or a thixotropic silicone oil-based gel filling compound 22. The compound 22 permits the ribbons 16, and hence the fibers 18, to move freely within the tube 14. Alternatively, the filling compound 22 can include a water blocking compound, a buffer filling material, oil or grease, or the filling compound 22 can be replaced by a water blocking tape or a water blocking yarn.

Outer strength members (OSMs) 24, such as reinforced aramid yarns, are applied as a layer and with a relatively long lay around the buffer tube 14. The OSMs 24 provide the inner core 12 and also the cable 10 with robustness and a predetermined tensile stiffness. The thickness and the physical properties of the layer of OSMs 24 determine, in part, the robustness of the core 12 and the cable 10. Preferably, the layer of OSMs 24 has a Young's modulus of about 80,000–110,000 MPa.

In a preferred embodiment, the OSMs 24 constitute four aramid yarns, each about 1420 deniers, which are helically wrapped around the outer surface of the buffer tube 14 with a long lay. The helical wrapping of the OSMs 24 minimizes the bending stiffness of the core 12 and the cable 10 while maintaining a high degree of strength in tension for the core 12 and the cable 10. Thus, the layer of OSMs 24 makes it more difficult to stretch or elongate the core 12 to a point of permanent deformation, which would degrade the performance of the cable 10. Deformation of the core in which the fibers are contained can cause the fibers to undergo excessive elongation or contraction and experience damaging breaks or fractures, which can result in significant deterioration of the optical signal transmission characteristics of the cable.

A corrugated, steel armor layer 26, preferably with protective and/or bonding material thereon, surrounds and encloses the layer of OSMs 24 longitudinally along the length of the cable 10. The strength and rigidity of the armor layer 26 provides rodent protection and enhances the crush resistance and tensile stiffness of the core 12 and the cable 10. The crush resistance and tensile stiffness of the armor layer 26 protect the fibers 18 within the fiber ribbons 16 from damage in the presence of external forces on the cable 10.

The armor layer 26 is advantageously formed from corrugated steel rather than from a flat stainless steel roll-formed tape which is longitudinally folded into a tube and welded as sometimes was done in the prior art. The process of horn or roller forming a corrugated steel layer longitudinally around the core with a polymer bonded overlap is less expensive and faster than forming a tube from stainless steel tape by continuously welding the two edges together.

In a preferred embodiment, the corrugated steel armor layer 26 is a layer of steel disposed around the tube 14 outer surface and the OSM layer 24. A polymeric coating 29 is, preferably, disposed on the outer and inner surfaces of the steel layer to promote adhesion between the overlapped portions of the steel layer. The manufacture of such a corrugated steel layer armor layer is less expensive and more easily obtained than welding stainless steel into a tube. The overlapped corrugated armor provides adequate protection from moisture, rodents and mechanical stresses without the disadvantages associated with a welded tape armor layer. The corrugated armor can be opened more easily opened by a field technician and is more flexible and, thus, also easier to handle and install.

The corrugated structure of the armor layer 26, furthermore, enhances the flexibility of the cable 10. When the cable 10 is subjected to bending, the corrugated armor layer 26 allows the core 12 to bend to a greater extent without permanently deforming the armor layer itself, thereby reducing the functionality of the armor layer, than would an armor layer formed from prior art roll-formed welded stainless steel.

Although not preferred, the armor layer 26 of the core 12 can be a stainless steel roll-formed tape welded into a tube to obtain the advantages of a more compact and smaller sized cable and also corrosion resistance.

In an alternative preferred embodiment, one or more completely dielectric, rigid anti-compression members, such as fiber glass rods or Kevlar rods impregnated with polymer resin, can be included in the core 12 in place of the steel armor layer 26.

A ripcord 34 is disposed between the armor layer 26 and the outer surface of the buffer tube 14. The corrugated structure of the armor layer 26 provides that the ripcord 34 can be pulled rather easily through the armor layer 26 to facilitate removal of a sheath 30, which encloses and surrounds the armor layer 26, from the core 12 after the cable 10 has been installed in the field. Greater ease of access to the fibers 18 within the core 12 is, therefore, obtained.

Water blocking material 28, such as flooding compound, flooding wax, flooding additive or a water swellable element, fills any or all empty spaces between the armor layer 26 and the outer surface of the buffer tube 14 along the length of the cable 10. The water swellable element can include water swellable powders, tapes, yarns, threads and coating layers. The water blocking material 28, preferably, is a longitudinal water blocking tape layer applied directly over the layer of OSMs 24. An optional binder (not shown) is used to maintain the water swellable tape 28 in the proper position surrounding the buffer tube 14. The water blocking tape 28 operates to block the ingress of water radially into the core 12 and towards the fibers 18 in the buffer tube 14.

In one alternative embodiment, water blocking material can be incorporated into the OSMs 24. For example, the OSMs 24 can constitute yarns which are treated with water swellable compounds.

In a further alternative embodiment, a water swellable coating can be applied to any of the outer surface of the buffer tube 14 and the inner and outer surfaces of the armor layer 26. In another alternative embodiment, a water swellable yarn can be helically wound around the core 12.

The jacketing or sheath layer 30 encloses and surrounds the armor layer 26 to form the composite core 12 structure. The sheath layer 30 is preferably extruded over the armor layer 26 and formed from polyethylene, and preferably a medium density polyethylene jacket compound. The polymeric coating layer 29, which is preferably disposed on the outer surface of the corrugated armor layer 26, also promotes adhesion between the armor layer 26 and the sheath layer 30.

In a preferred embodiment, the sheath layer 30 has a Young's modulus of about 200–800 MPa and a thickness of about 0.70–1.80 mm. Further, the outer and inner diameters of the sheath layer 30 for the core 12 are preferably about 8.60–8.70 mm and about 7.00–7.10 mm, respectively.

The core 12 is a complete, self-contained and independent cable which can be handled, stored or installed and can maintain its integrity under a wide range of adverse conditions without any of the outer components of the cable 10, which are described in detail below. In a preferred embodiment, the above-described components of the core 12 are constructed with relatively lightweight and flexible materials to ease handling of the core 12 and its internal components during storage on a reel or installation in ducts, trays or passageways. In a further preferred embodiment, the inner core 12 can have a simple and lightweight construction that facilitates access to and handling of the fibers 18 when the cable 10, and also the core 12, are spliced. It is to be understood, however, that the structure of the core 12 can be made more robust, such as to provide increased tensile stiffness and antibuckling properties, by increasing the thickness of either or both the layer of OSMs 24 and the armor layer 26 or by adding rigid dielectric rods, especially where it is undesirable to have a conductive element within the core 12.

An outer sheath or jacketing layer 40 completely surrounds and encloses the core 12 along its length and, thus, forms the composite cable structure of the cable 10. The outer sheath 40 is preferably extruded over the core 12 and formed from polyethylene, and most preferably a medium density polyethylene jacket compound. The sheath 40 includes all of the components which are disposed outside the inner core 12 to enhance the utility of the core 12 for a particular application. The inner core 12 typically is of simpler, lighter construction than the sheath 40 to facilitate access and handling at splicing points. The components in the sheath 40 and the sheath 40 itself also enhance the strength and durability of the cable 10. The components in the sheath 40, however, are disposed so that they can be easily removed when access to the inner core 12 is desired.

The sheath 40 protects the internal components of the core 12, such as the fibers 18, from severe environmental conditions, such as moisture and hot and cold temperatures of about −50° C. to about 65° C. Further, the sheath 40 protects the internal components of the cable 10 from the adverse affects of abrasion. The sheath 40 has a peripheral outer surface 50 which conforms substantially to the surface of a cylinder. In a preferred embodiment, the sheath 40 has an outside diameter of about 13.2 mm and a Young's modulus of about 200–800 MPa.

In accordance with the present invention, the cable 10 has only one reinforcing strength member unit received within the outer jacket 40 and which is of sufficient strength to support the entire weight of the cable in an aerial installation. In the embodiment illustrated in FIGS. 1–2, the single strength member unit is a single reinforcing strength member 44 embedded in the jacket 40 which is cylindrical in shape, has a diameter of about 2.70 mm and extends longitudinally along and parallel to the core 12. The jacket 40 preferably is extruded over both the core 12 and the strength member 44 in a single processing step. The inclusion of the strength member 44 in the jacket 40 makes the cable 10 non-axisymmetric The strength member 44 provides tensile strength and antibuckling properties to the cable 10 and the core 12. In a preferred embodiment, the strength member 44 is of sufficient strength to minimize bending of the cable 10 into a small radius, which could adversely affect cable performance.

The strength member 44 is made from a high strength material and can be formed from a dielectric, fiber reinforced polymer or a metallic material. In a preferred embodiment, the strength member 44 is a galvanized high tensile steel rod, although the strength member 44 can include other types of steel. The galvanizing of the strength member 44 increases its corrosion resistance. Corrosion resistance is particularly desirable for an aerial installation of the cable 10 where portions of the strength member 44 are exposed to the environment. It is to be understood that other types of corrosion resistant coating layers can be disposed on the strength member 44 or that the strength member 44 itself can be made of materials which are inherently corrosion resistant.

In a preferred embodiment, the strength member 44 is a single rod and this single rod is of sufficient strength to support the entire weight of the cable 10 in an aerial installation, as explained in greater detail below.

In a further embodiment, the strength member 44 is cleaned or pickled to improve its adhesion to the materials used to form the outer jacket 40. Good adhesion between the strength member 44 and the surrounding plastic material of the jacket 40 can reduce or eliminate the need to include water blocking agents with or surrounding the strength member 44 and to increase the coupling of the strength member 44 with the core 12. If desired, the strength member 44 can be coated with a water swellable agent for water blocking purposes.

In a preferred embodiment, the strength member 44 is completely embedded within the jacket 40. It to be understood, however, that a small portion of the strength member 44 can be at the outer or inner surface of the jacket 40 or form a portion of the outer surface 50 of the cable 10 or the inner surface of the jacket 40.

Preferably, the outer surface 50 of the jacket 40 includes indicia 56 so that the position of the strength member 44 is readily apparent from externally of the cable 10. The indicia 56, preferably, is a ridge or groove on or in a portion of the jacket surface 50. The indicia 56 longitudinally tracks the strength member 44 along the surface of the cable 10 to identify the location of the strength member 44 within the cable 10. Alternatively, the indicia 56 can be a colored line on the outer surface 50 of the jacket 40. The indicia 56 makes twists in the cable 10 readily apparent during storage and installation of the cable 10 and when it is desired to expose portions of the strength member 44.

Preferably, a release coating layer 42 is disposed between the jacket 30 and the outer jacket 40 and covers the outer surface of the jacket 30. The coating 42 is, preferably, a very thin layer having a thickness from about 1–50 microns, and most preferably from about 1–10 microns. The release coating layer 42 prevents the outer jacket 40 from being strongly adhesively bonded to the inner jacket 30. The release coating layer 42, therefore, provides that the outer jacket 40 can be removed very rapidly and easily from the cable 10 when access to the inner core 12, and the fibers 18 contained therein, is desired. The release coating layer 42 on the jacket 30 also provides that standard tools for cutting through a standard-sized cable can be used with the cable 10. This eases splicing operations in the field and access to the fibers 18 included in the core 12, which also can be the size of a standard cable.

Further, the release coating layer 42 provides that the strength member 44 can be easily accessed. Access to the strength member 44 is desirable, for example, in an aerial installation of the cable 10.

The release coating layer 42 is preferably formed from a composition consisting essentially of a release agent which is not chemically reactive with either of the jackets 30 and 40 and is thermally stable under normal processing conditions. In one embodiment, the release agent comprises a hydrophobic, flouropolymer material with a solvent carrier, such as, for example, Miller Stephenson MS-143DF Release Agent. The hydrophobicity of the release agent provides that the surface tension of any water droplets on the coating layer 42 is not overcome by an attraction between the water droplets and the coating layer 42. Thus, the hydrophobic release agent decreases the likelihood that water droplets that contact the coating layer 42 would be drawn by capillary action into any small holes or gaps which exist between the jacket layers 30 and 40.

In a preferred embodiment, the jacket layer 30 tightly encloses and covers the elements within the core 12, the coating layer 42 is formed from a hydrophobic release agent and the jackets 30 and 40 contain relatively few apertures into which water, such as water droplets on the coating layer 42, can be drawn. In this preferred embodiment, a water blocking agent is not disposed between the two jackets 30 and 40. A cost savings in the manufacture of the cable 10 according to such embodiment is obtained because it is less expensive to apply a single release agent coating layer than to apply the release agent coating layer and also water swellable agents between the jackets 30 and 40.

In a preferred embodiment, the release agent layer 42 is dry and non-tacky to the touch. This feature enhances the safety and ease in the handling of the core 12 after the outer jacket 40 has been removed. It is well known that water swellable agents, which can be disposed between the jackets 30 and 40, can contaminate components within the core 12 and any associated working surface used in connection with obtaining access to the fibers in the cable. For example, when some water swellable agents, such as water swellable powders, are exposed to and mixed with water, the surfaces of the cable components that come in contact with the water swellable agents can become dangerously slippery. A dry release coating layer 42 eliminates the need to clean a slippery residue, such as a sticky wax or a slippery water swellable material, after the jacket 40 is removed and before splicing into the core 12 is performed.

In a preferred embodiment, a composition consisting essentially of the Miller Stephenson release agent is applied to the jacket 30 as a relatively thin layer and then subsequently allowed to dry to form the dry, non-tacky release coating layer 42. The release coating layer 42 is a much thinner layer than the layer of release agent composition originally applied to the jacket 30 because the composition primarily contains a solvent that evaporates during drying. Preferably, the composition consists essentially of about 1–5% by weight release agent and about 99–95% by weight solvent. The volatility of the solvent advantageously provides that the composition which forms the coating layer 42 is easily dried and includes mostly dried release agent. Substantially all of the solvent evaporates before the outer jacket 40 is formed over the inner core 12, such as by plastic extrusion. The rapid drying feature of the solvent of the release agent composition, thus, minimizes and substantially eliminates any risk that bubbles would form in the jacket 40 if any remaining solvent in the release layer 42 is exposed to the heat concomitant to extruding plastic material over the core 12 to form the jacket 40.

In an alternative embodiment, a longitudinal ripcord (not shown) is disposed between the jacket 40 and the jacket 30.

Figure 3:
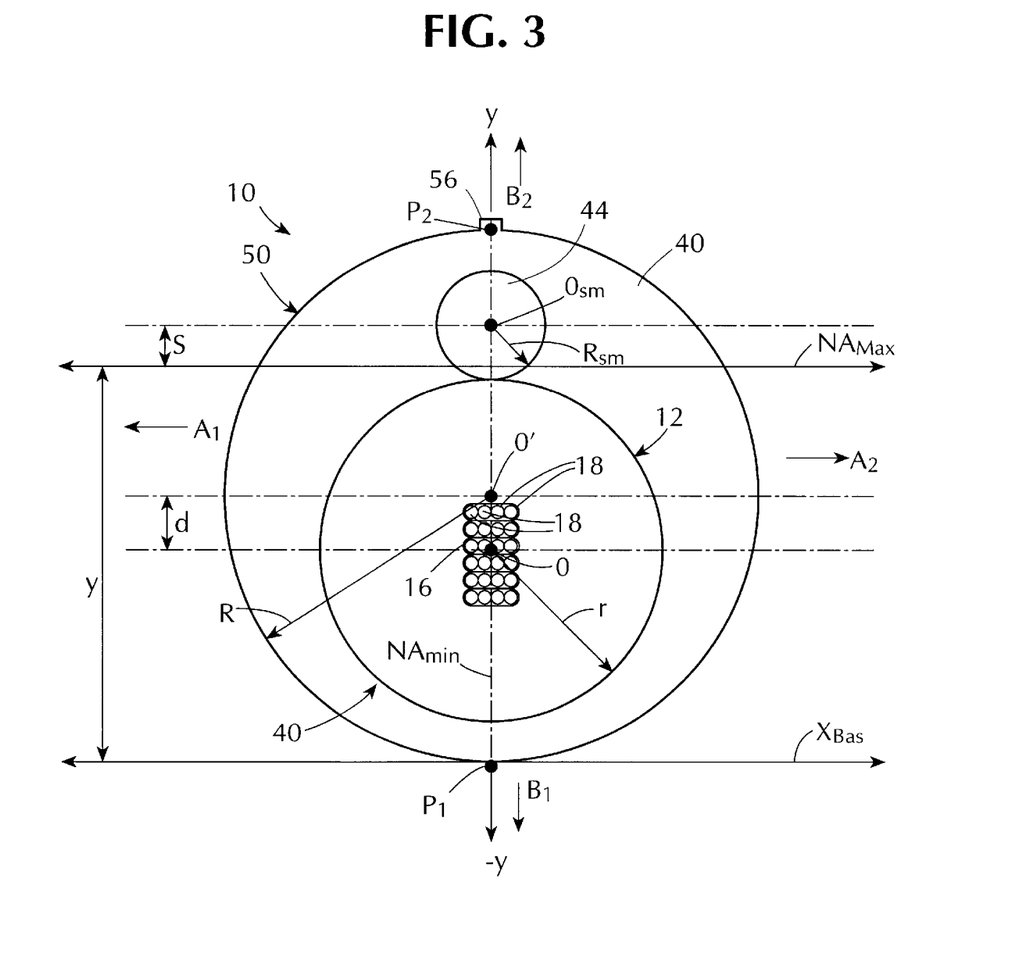
FIG. 3 is a view similar to that of FIG. 2 with components of the core removed and illustrating neutral surfaces associated with bending of the cable in the planes of minimum and maximum bending energy.

FIG. 3 is a cross-sectional view of the cable 10 which is similar to FIG. 2 except that only the stack of optical fiber ribbons 16, the strength member 44 and the jacket 40, which defines a region in which an optical fiber can be loosely held, are shown. FIG. 3 further includes markings that are referred to below to describe, in accordance with the present invention, the relation of the planes of minimum and maximum bending energy of the cable 10 and the respective associated neutral surfaces.

Referring to FIGS. 1 and 3, the cable 10 has a radius R and the core 12 has a radius r. The center O of the core 12 is eccentric from the center O' of the cable 10 a distance d, where d is preferably equal to about 1.35 mm. The jacket 40 gradually increases in thickness circumferentially from a point $P_1$ to a point $P_2$ which is disposed in diametrically opposed relation to the point $P_1$. $P_1$ is the point on the cross-section of the wall surface 50 which is opposed to the strength member 44 and closest to the inner surface of the jacket 40. The circumferential thickness of the jacket 40 at $P_1$ can be about 0.90 mm. The strength member 44 is, preferably, substantially embedded in the portion of the jacket 40 adjacent to the point $P_2$ such that the centers O and O' and center $O_{sm}$ of the strength member 44 are linearly aligned and, hence, in a plane including the y and z axes, the z axis passing through the point $P_1$ and extending longitudinally of the cable 10 parallel to the axis of the jacket 40.

In the illustrated embodiment of the cable 10, the indicia 56 on the surface 50 identifies a circumferential portion of the jacket 40 between the strength member 44 and the surface 50 which is relatively thin, such as between about 0.8–1.5 mm and, preferably, 1.0 mm. The indicia 56 extends through points on the surface 50 having the same circumferential position as point $P_2$ and is longitudinally aligned with the strength member 44 along the cable 10. A thin portion on the jacket 40 is a desirable point for accessing the strength member 44.

It is apparent from FIGS. 1 and 3 that the cable 10 can be bent in several directions transversely to the z axis. Thus, the cable 10 can be bent in the direction $A_1$ or $A_2$, $B_1$ or $B_2$ or any direction therebetween. The optical fiber ribbons 16 are loosely received in the tube 14, and such ribbons 16 do not significantly affect the bending rigidity of the core 12. Since the core 12 is of substantially the same composition in all directions radially of the core axis passing through the core center O, the bending rigidity of the core 12 is substantially the same in all directions radially of the core axis. However, the components and construction of the core 12 affect the bending force required.

By encircling the core 12 with the outer jacket 40 in contact with the inner jacket 30 and having the strength member 44 therein, the cable 10 can be made to have resistance to bending which is different with different directions of bending. Thus, the resistance to bending is affected by the wall thickness of the outer jacket 40 and the physical properties and location of the strength member 44.

With reference to FIGS. 1 and 3, it will be apparent that there are three mutually perpendicular planes (not shown), i.e., a y-z plane containing the y and z axes, an x-z plane containing the x and z axes and an x-y plane containing the x and y axes. The y-z plane intersects the axis of the strength member 44, the centers O and O' and the points $P_1$ and $P_2$. The x-z plane is perpendicular to the y-z plane and intersects the point $P_1$. The cross-section shown in FIG. 3 lies in the x-y plane.

For purposes of reference, when the cable 10 is said to be bent or undergo bending in the x-z plane, it is to be understood that the cable 10 is bent without twisting and that a portion of the outer surface 50 of the jacket 40 along the longitudinal length of the cable 10 always is tangent to the x-z plane. Bending of the cable 10 in the x-z plane can occur, for example, by bending the cable so that the portions of the cable 10 on the left and right hand sides of the point $P_1$ on the outer surface 50 of the jacket 40 are bent in the directions $A_1$ and $A_2$, respectively, as shown in FIGS. 1 and 3. Bending of the cable 10 in the y-z plane can occur so that portions of the cable 10 above $P_1$ are bent in the directions $B_1$ and $B_2$, respectively, as shown in FIG. 3.

As is well known, when the cable 10 is bent in a particular plane, one portion of the cable 10 is shortened and under compressive force while the other portion of the cable 10 is extended and under tensile force. The compressive and tensile forces cancel at the neutral surface associated with bending of the cable in the particular plane. The intersection of the neutral surface associated with bending of the cable 10 in a particular plane is shown in FIG. 3 as a neutral axis line NA through the cross-section of the cable 10.

In accordance with the present invention, the single strength member 44 has physical properties and a position within the jacket 40 in relation to the center O' of the cable 10, the wall of the jacket 40 is shaped and the components of the core 12, such as the OSMs 24 and the armor layer 26, have physical properties and positions within the core 12 of the cable 10 in relation to the outer jacket 40 and the strength member 44 to provide the cable 10 with several advantages. The combination of the components minimizes the size and bulk of the cable 10 and enhances the durability of the cable 10. Further, the combination eases handling, maneuverability and flexibility of the cable 10 and allows for relative ease of bending of the cable 10 without twisting in planes other than the MIN-BP, during storage and installation and particularly in an aerial installation. The cable 10 further has sufficient tensile strength and antibuckling properties to protect the fibers 18 from mechanical stress, which can degrade the optical transmission characteristics of the fibers 18, in the desired installations of the cable, including an aerial installation.

The strength member 44 in the cable 10 provides that the MIN-BP of the cable 10 is in the x-z plane. The MIN-BP has an associated neutral surface whose intersection with the cable 10 cross-section is neutral axis $NA_{Min}$. $NA_{Min}$ passes through the centers O, O' and $O_{sm}$ and symmetrically bisects the cross-section of the cable 10, as shown in FIGS. 1 and 3. Bending of the cable 10 in the MIN-BP is the most favored or preferred bending because a minimum of energy or force is required to bend the cable in this manner without twisting. The cable 10, therefore, when subjected to bending, will attempt to orient itself so that bending occurs in the MIN-BP without twisting.

When the cable 10 is bent in the MIN-BP, the compressive and tension forces on the cable components are symmetrically distributed about the associated neutral surface and equal portions of the cable 10 are in compression and tension. The fibers 18 of the ribbon stack, which lie on or near $NA_{Min}$ as shown in FIG. 3, will thus experience zero or minimum stress for such bending of the cable 10. For example, when the cable 10 is wound onto a storage or take-up reel, the neutral surface associated with the MIN-BP would orient itself to follow the outer surface of the reel.

Consequently with the cable of the invention, many, if not all, the optical fibers will be at or near $NA_{Min}$, and therefore, will be subject to little if any stress due to bending of the cable in x-z plane. Although this will not be the case with bending the y-z plane, the EFL of the optical fibers and the ratio of the buffer tube bore area and the cross-sectional area of the optical fibers are selected so that the fibers are not stressed under expected installed, handling and storage conditions.

A symmetrical distribution of compression and tension forces in the cable 10 does not occur, however, when the cable 10 is subjected to bending in a plane other than the MIN-BP.

In accordance with the present invention, the strength member 44 contributes to the overall bending rigidity and flexibility of the cable 10 while providing that the cable 10 also can be relatively easily bent in the plane of maximum bending energy ("MAX-BP"), such as would be desired and occur in an aerial installation of the cable as discussed below. Although it is more difficult to bend the cable 10 in a plane other than in the MIN-BP, the cable 10 requires less bending force in planes other than the MIN-BP, including the MAX-BP, than is required with prior art cables having a plurality of strength members. Thus, the strength member 44 provides for ease of handling of the cable 10 during storage and installation while simultaneously maintaining the cable 10 robust to protect the fibers 18 from mechanical stress, which can degrade the optical signal transmission characteristics of the fibers in the cable, in an aerial installation or other common installation of the cable.

In anticipated installations of the cable 10 in the air and through passageways in the ground, the cable 10 would often be subjected to bending in more than one plane and it is desirable that the cable can be bent in each of such planes with relative ease and without twisting. For example, a cable installation may require bending without twisting in a first plane and then in a plane orthogonal to the first plane.

Referring again to FIGS. 1 and 3, the MAX-BP of the cable 10 is in the y-z plane and has an associated neutral surface whose intersection with the cable 10 cross-section is neutral axis $NA_{Max}$. $NA_{Max}$ lies completely outside the core 12 and intersects a portion of the strength member 44. As shown in FIG. 3, $NA_{Max}$ is parallel to an x-axis basis line, $X_{Bas}$, which is a reference line drawn tangent to point $P_1$ on the surface 50. Thus, the fibers 18 are not and cannot be coincident with the neutral surface associated with bending of the cable 10 in the MAX-BP.

In the illustrated embodiment, $NA_{Max}$ is offset a distance s from the center $O_{sm}$ of the strength member 44 and towards the center O' of the cable 10. The strength member 44 is preferably positioned within the jacket 40 with its center $O_{sm}$ on the axial line $NA_{Min}$. Depending on the properties and position of the strength member 44 in the jacket 40 and on the properties and the position of the components in the core 12 which contribute substantially to the rigidity of the cable 10, s can be $0 \leq s \leq R_{sm} + \Delta S_{40}$, where $R_{sm}$ is equal to the radius of the strength member 44 and $\Delta S_{40}$ is the distance, as measured along the axial line $NA_{Min}$, between the inner surface of the jacket 40 and the point on the outer surface of the strength member 44 which is on the axial line $NA_{Min}$ and closest to the core 12. As explained below, the properties of the strength member 44 and its position in the jacket 40 significantly contribute to the shifting of the position of $NA_{Max}$ away from the core 12 centroid and so that $NA_{Max}$ does not intersect the core 12.

In an alternative embodiment, the properties and position of the strength member 44 in the jacket 40 and the properties and the position of the components in the core 12 which contribute substantially to the rigidity of the cable can provide that s of such a value that $NA_{Max}$ intersects the core 12 and may or may not intersect the bore of the core 12.

As shown in FIG. 3, $NA_{Max}$ does not symmetrically bisect the cross-section of the cable 10. Thus, for bending of the cable in the MAX-BP, equal portions of the cable 10 are not in compression and tension. This lack of symmetry in the distribution of forces makes it is more difficult to bend the cable 10 in the MAX-BP than in the MIN-BP. Substantially more of the cable will either be in compression or tension, depending upon how the cable 10 is bent in the MAX-BP.

Thus, the inclusion of only a single strength member in the jacket of an optical fiber cable containing fibers loosely held in the bore of an inner core and having a selected predetermined EFL and ratio of cross-sectional area to bore cross-sectional area, in accordance with the present invention, provides for an optical cable with the above-described desired functional features. Under normal conditions, the EFL range can be about –0.05% to about 0.1% and the ratio of the cross-sectional area of the optical fibers to the cross-sectional area of the bore can be about 3:1 to about 6:1, and preferably 5:1. The inventive cable 10 also overcomes the inefficiencies and disadvantages associated with the use of prior art cables having a plurality of strength members in the outer jacket of the cable which did not provide tensile strength to the cable in an aerial application.

The inclusion of only a single strength member in the form of a solid rod in the cable 10 also provides the advantage that the outer diameter of the cable 10 is smaller than the outer diameter of a cable having a strength member formed from a plurality of strands of high tensile strength material which are twisted together and which can be used to make a support strand for a cable as described in U.S. Pat. No. 5,095,176, incorporated by reference herein. The outer diameter of the cable 10 is, preferably, about 13.3 mm, but can be less. A single solid rod strength member in the jacket 40 adds less thickness to the cable 10 than if the jacket 40 includes two diametrically opposed smaller strength member strands with the same total cross-sectional area as the single solid rod because cross-sectional area is proportional to the square of the radius. Further, the smaller diameter optical cable achieved by inclusion of only a single strength member in the cable 10 outer jacket 40 contributes to minimizing stress on the fibers 18 when the cable 10 is bent.

Referring to FIG. 3, the position y of $NA_{Max}$ associated with bending of the cable 10 in the MAX-BP can be determined based on the total bending rigidity, $EJ_{tot}$, of the components in the cable 10 and with reference to an x-y coordinate system having its origin at point $P_1$ on the cable 10. The bending rigidity of the cable 10 can be defined, where y is with reference to $X_{Bas}$, as follows:

$$EJ_{tot} = \sum_1^n E_i J_i + \sum_1^n A_i E_i (b_i - y)^2 \quad (1)$$

where i designates a component in the cable 10 that contributes to the bending rigidity of the cable, where $A_i$ is equal to the cross-sectional area of an ith component, where $E_i$ is equal to the Young's modulus of an ith component, where $b_i$ is equal to the y-coordinate of the neutral axis of an Ah component with the respect to $X_{Bas}$ and where $J_i$ is equal to the bending moment of inertia of an ith component about its centroidal axis.

By taking the derivative of Equation (1) with respect to y and searching for the minimum of $EJ_{tot}$, y can be derived as follows:

$$\frac{dEJ_{tot}}{dy} = -2 \sum_1^n A_i E_i (b_i - y)^2 = 0; \quad (2)$$

$$\sum_1^n A_i E_i b_i - y \sum_1^n A_i E_i = 0; \quad (3)$$

$$y = \frac{\sum_1^n A_i E_i b_i}{\sum_1^n A_i E_i}. \quad (4)$$

As evident from Equation (4), each of the components in the cable 10 independently contributes to defining the position y of $NA_{Max}$ with respect to $X_{Bas}$ for bending of the cable in the MAX-BP. The contributing components can comprise, for example, the buffer tube 14, the OSM layer 24, the strength member 44, the core jacket 30, the armor layer 26 and the exterior jacket 40.

For example, the position y of the $NA_{Max}$ with respect to $X_{Bas}$ for the cable 10 of the invention positioned with respect to $X_{Bas}$ as illustrated in FIGS. 1 and 3 and having the following E, A and b values, when determined using Equation (4), would be equal to 10.44 mm.

| Cable 10 Components | E(MPa) | A(m$^2$) | b(m) |
|---|---|---|---|
| Buffer tube 14 | 2310 | 7.383 × 10$^{-6}$ | 5.30 × 10$^{-3}$ |
| OSM layer 24 | 90,000 | 6.85 × 10$^{-7}$ | 5.30 × 10$^{-3}$ |
| Armor layer 26 | 9450 | 1.822 × 10$^{-6}$ | 5.30 × 10$^{-3}$ |
| Inner Jacket 30 | 221 | 1.985 × 10$^{-5}$ | 5.30 × 10$^{-3}$ |
| Strength member 44 | 200 × 10$^{-3}$ | 5.726 × 10$^{-6}$ | 10.95 × 10$^{-3}$ |
| Outer Jacket 40 | 221 | 7.323 × 10$^{-5}$ | 6.65 × 10$^{-3}$ |

Therefore, for such a cable 10, $NA_{Max}$ intersects the strength member 44. Each of the layer of OSMs 24 and corrugated armor layer 24 has a substantially large Young's modulus which makes the inner cable core 12, and thus the cable 10, more stiff. With increasing stiffness of the core 12, the position y of $NA_{Max}$ shifts a greater distance away from the center $O_{sm}$ of the strength member 44 along $NA_{Min}$ and towards the center of the cable 10 and the center of the core 12. Although the components in the core 12 such as the layer of OSMs 24 and armor layer 26 can alter the position y of $NA_{Max}$ in the cable 10, the high Young's modulus of the single strength member 44 and its position within the jacket 40 of the cable 10 preferably provide that the position y of $NA_{Max}$ cannot be within the core 12.

In a preferred embodiment, the inner core 12 can be made stiffer, such as by including aramid yarns or OSMs 24 in the core 12, to reduce or eliminate undesirable shifting of the fibers 18 within the tube 14. It is to be understood, however, that the cable 10 preferably is not made so stiff that it could not be bent in planes other than the MIN-BP without requiring substantially more energy or force than that required for bending of the cable in the MIN-BP. In a preferred embodiment, the energy required for bending of the cable 10 in the MAX-BP is about 2.7–4.7 times greater, and most preferably about 3.7 times greater, than the energy required for bending of the cable 10 in the MIN-BP. The shifting of the fibers 18 can occur when the neutral surface associated with the bending of the cable does not intersect the center of the buffer tube and the fibers, as would occur for bending of the cable 10 in the MAX-BP. As the core 12 stiffness is increased, the cable structure exhibits a greater preference for bending in the MIN-BP. The preference is greater because the difference between the energy required for bending the cable in the MIN-BP and for bending the cable in planes other than the MIN-BP, including the MAX-BP, is increased, thereby making bending of the cable in a plane other than the MIN-BP more difficult. Thus, when the cable 10 having a relatively stiffer core 12 is subjected to bending forces in the MAX-BP, the position of the fibers 18 in the core 12 will experience relatively little disturbance because the stiffness of the cable 10 avoids substantial bending in the MAX-BP.

The cable 10 is especially useful as an aerial cable. The strength member 44, preferably, constitutes a cylindrical single solid steel rod having sufficient tensile strength and modulus to support the entire weight of the cable 10 between supports. In an aerial installation of the cable 10, longitudinal portions of the jacket 40 are removed to expose portions of the strength member 44. The release agent 42 between the jackets 30 and 40 facilitates removal of the jacket 40 and access to the strength member 44. Clamps are easily coupled to the exposed strength member 44 portions and used to secure the strength member 44 to vertical supports, such as a telephone poles. The sturdy and robust construction of the strength member 44 provides that the clamps need to grasp only the exposed strength member 44 portions of the cable 10 for an aerial installation of the cable 10.

The use of a single rod for clamping in an aerial installation of the cable 10, furthermore, saves time because a workperson would only need to access one member in the outer jacket 40 to secure the cable to a vertical support.

When the cable 10 is bent in the MAX-BP in an aerial installation, the possible radial displacement of the fibers 18 in the core 12 increases as a function of how far $NA_{Max}$ is from the center of the tube 14 and the actual EFL of the fibers 18. The EFL of the fibers 18 is, therefore, preferably, suitably set during manufacture of the cable 10 to compensate for such anticipated bending of the cable 10 in the MAX-BP in an aerial installation to avoid or minimize stress on the fibers 18. Precise control of the EFL, however, is not necessary if anticipated bending of the cable 10 is in the MIN-BP, which ordinarily is preferred. The cable 10, for example, would naturally seek to orient itself to bend in the MIN-BP during storage on a reel or in an installation where the strength member 44 on the cable itself is not secured to a fixed, rigid external component, such as when the cable 10 is installed in a duct or buried directly in the ground.

Thus, the cable 10 can operate without substantial degradation of optical signal transmission characteristics in an aerial installation for the anticipated bending in the MAX-BP. The single strength member 44, in the aerial application of the cable 10, continues to provide the cable 10 with tensile strength and antibuckling properties. Also, the cable 10 can be bent with little resistance in the MIN-BP and with greater but not large resistance in planes other than the MIN-BP, which bending may occur for an aerially installed cable 10 because of high wind conditions.

In a further preferred embodiment, the single strength member 44 can be of a standard size so that standard hardware can be used to easily insert an exposed portion of the member 44 into an opening of a clamp where the opening is so shaped that the inserted portion cannot be pulled out of the opening once the strength member 44 is fully inserted.

Figure 4:
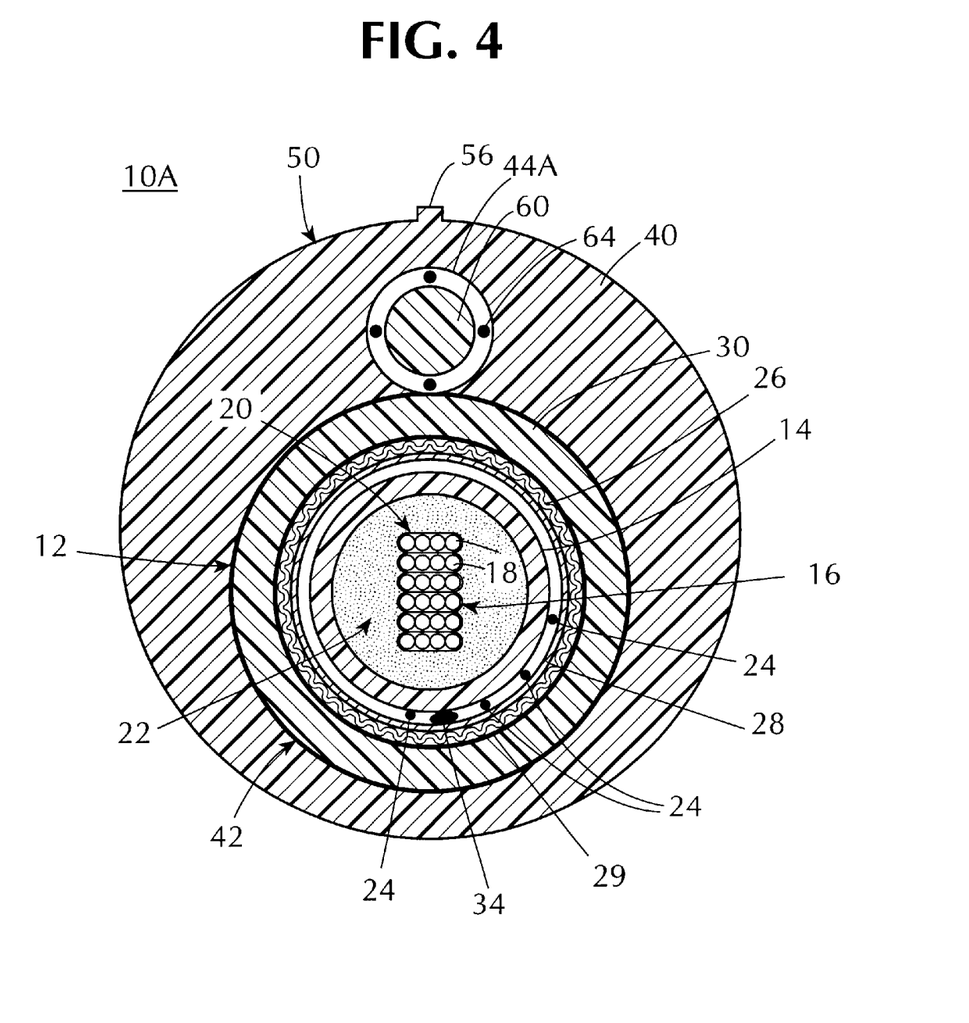
FIG. 4 is a cross-sectional view of a preferred embodiment of an optical fiber cable including a single strength member in the outer jacket in accordance with the present invention.

FIG. 4 is a cross-sectional view of a cable 10A in accordance with the present invention. Components in the cable 10A identical to those described above with respect to the cable 10 are referred to below using like reference numerals. Referring to FIG. 4, the cable 10A is identical in construction and operation as the cable 10, except that the cable 10A does not include the strength member 44 and the outer jacket 40 includes a bore 44A. The bore 44A has similar or the same dimensions as the strength member 44 and is positioned within the outer jacket 40 in relation to the core 12 similarly or the same as the strength member 44 is positioned in the cable 10. The bore 44A receives a single strength member 60 and a plurality of longitudinally extending strength members 64 disposed about the strength member 60. The strength member 60 has a diameter less than the diameter of the bore 44A. The strength member 60 has the same construction and functional properties as the strength member 44 to provide that the $NA_{Min}$ is located in the cable 10A with respect to the strength member 60 and the core 12 similarly as in the cable 10 with respect to the strength member 44 and the core 12, and that the cable 10A can be relatively easily bent in the MAX-BP.

In a preferred embodiment, the diameter of the strength member 60 is of a sufficiently large value to provide that the strength member 60 is tightly received within the bore 44A without causing damage to the strength members 64 disposed about the member 60. In a preferred embodiment, the strength members 64 are aramid yarns wound around the member 60 and having a denier of about 400–8000. The aramid yarn strength members 64 provide for greater ease of separation of the strength member 60 from the jacket 40 when desired, for example, in an aerial installation of the cable 10A. Although the strength members 64 provide some tensile strength to the cable 10A, the single strength member 60 is the sole element in the cable 10B having sufficient strength to support the entire weight of the cable 10B in an aerial installation and the strength members of contribute insubstantially to determining the locations of $NA_{Max}$ and $NA_{Min}$ in the cable 10A in accordance with the invention parameters set forth above with respect to the core 12 and the strength member 44 in the cable 10.

Figure 5:
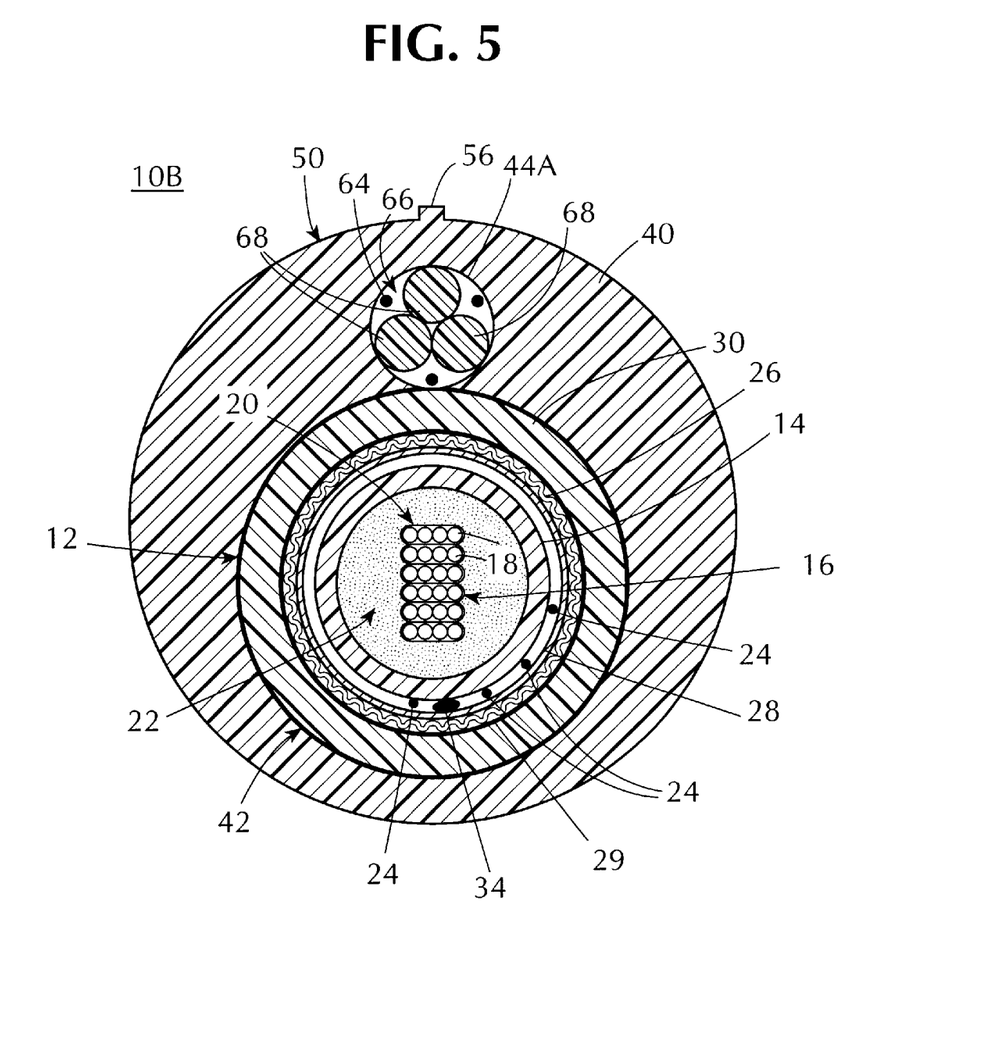
FIG. 5 is a cross-sectional view of another preferred embodiment of a single strength member unit including a plurality of strength members in the outer jacket in accordance with the present invention.

FIG. 5 is a cross-sectional view of a cable 10B in accordance with the present invention. Components in the cable 10B identical to those described above with respect to the cable 10 are referred to below using like reference numerals. Referring to FIG. 5, the cable 10B is identical in construction and operation as the cable 10, except that cable 10B does not include the strength member 44 and the outer jacket 40 includes a bore 44A having similar or the same dimensions and positioning within the cable 10B as described above for the cable 10A. Referring to FIG. 5, the bore 44A receives a single strength member unit 66 including three strands of high tensile strength members 68. The strength members 68 are arranged, for example, in a substantially triangular configuration with the members 68 adhesively coupled to one another along their longitudinal length or in a twisted or braid configuration with the members 68 twisting about one another along their longitudinal length. Each of the strength members 68 includes high tensile material which is the same as or similar to the high tensile material included in the strength member 44. In a preferred embodiment, each of the members 68 is made of the same materials and such materials are included in each of the members 68 in the same or similar manner as the materials are included in the strength member 44. In a further preferred embodiment, the diameter of each of the members 68 is the same and selected to provide that the single strength member unit 66 is tightly received within the bore 44A defined in the jacket 40.

In a further preferred embodiment, the members 68 are embedded in the jacket 40, i.e., substantially all of the otherwise empty spaces in the bore 44A are filled with jacketing material.

Referring to FIG. 5, the bore 44A further includes a plurality of longitudinally extending strength members 64 disposed in any of the otherwise empty spaces in the bore 44A not occupied by the single strength member unit 66. In a preferred embodiment, the arrangement and diameters of the strength members 68 are such that all of the strength members 64 are disposed about the single strength member unit 66 and the single strength member unit 66 is tightly received within the bore 44A without causing damage to the strength members 64 disposed thereabout. The aramid yarn strength members 64 provide for greater ease of separation of the single strength member unit 66 from the jacket 40 when desired, for example, in an aerial installation of the cable 10B. As in the cable 10A, the strength members 64 do not provide substantial tensile strength to the cable 10B. Instead, the single strength member unit 66 is the sole element in the cable 10B having sufficient strength to support the entire weight of the cable 10B in an aerial installation and the strength members 64 contribute insubstantially to determining the locations of $NA_{Max}$ and $NA_{Min}$ in the cable 10B in accordance with the requirement set forth above with respect to the cable 10 and cable 10A.

Although preferred embodiments of the present invention have been described and illustrated, it will be apparent to those skilled in the art that various modifications may be made without departing from the principles of the invention.

We claim:

1. An optical fiber cable comprising:
   a longitudinally extending inner core defining a bore loosely receiving at least one optical fiber;
   an outer jacket enclosing the inner core and including a single strength member unit within the outer jacket, wherein the single strength member unit extends along a longitudinal axis of the cable parallel to the inner core and is the only element in the cable having sufficient strength to support the entire weight of the cable when the cable is installed in an aerial application secured from spaced vertical poles;
   wherein a neutral axis $NA_{Min}$ associated with bending of the cable in a plane of minimum bending energy MIN-BP intersects the core and the single strength member unit and is orthogonal to a neutral axis $NA_{Max}$ associated with bending of the cable in a plane of maximum bending energy MAX-BP.

2. The cable of claim 1, wherein the $NA_{Max}$ is within the outer jacket and does not intersect the core.

3. The cable of claim 2, wherein the $NA_{Max}$ does not intersect the bore of the core.

4. The cable of claim 1, wherein the $NA_{Min}$ intersects the bore of the core and the axis of the single strength member unit.

5. The cable of claim 1, wherein the position of the single strength member unit, the single strength member unit and the shaping of the outer jacket are selected so that the $NA_{Min}$ is in the same plane in which the axes of the single strength member unit, the outer jacket and the bore lie.

6. The cable of claim 1, wherein the position of the single strength member unit, the single strength member unit and the shaping of the outer jacket are selected so that bending of the cable in a plane other than the MIN-BP does not require substantially more energy than that required for bending of the cable in the MIN-BP.

7. The cable of claim 1, wherein the position of the single strength member unit, the material composition of the single strength member unit and the shaping of the outer jacket are selected so that the $NA_{Min}$ intersects the geometric centers of the cable and the single strength member unit.

8. The cable of claim 7, wherein the nominal path of the fiber within the bore is along the core axis.

9. The cable of claim 7, wherein the $NA_{Max}$ intersects the single strength member unit.

10. The cable of claim 1, wherein the fiber has an excess fiber length (EFL), and the EFL and the cross-sectional area of the bore are selected to minimize stress to the fiber when the cable is subjected to bending.

11. The cable of claim 10, wherein the EFL and the cross-sectional area of the bore are selected to minimize stress to the fiber when the cable is subjected to bending in the MAX-BP.

12. The cable of claim 1, wherein the axis of the core displaced with respect to the axis of the jacket in a direction away from the single strength member unit and wherein the axes of the core and the outer jacket lie in the same plane.

13. The cable of claim 12, wherein the axis of the single strength member unit is in said same plane.

14. The cable of claim 1, wherein the outer jacket and the core include respective outer surfaces each having a shape conforming to the surface of a cylinder, and
   wherein the core further comprises:
   a buffer tube defining the bore in which the at least one optical fiber is loosely received;
   filling compound in any empty space in the buffer tube; and
   an outer longitudinally extending plastic jacket surrounding the buffer tube.

15. The cable of claim 14, wherein the core further comprises at least one longitudinally extending outer strength member layer which is disposed between the buffer tube and the jacket of the inner core.

16. The cable of claim 15, wherein the outer strength member layer comprises at least two aramid yarns wrapped longitudinally around the buffer tube.

17. The cable of claim 16, wherein the at least two aramid yarns are helically wrapped around the buffer tube.

18. The cable of claim 14, wherein the core further crises at least one longitudinally extending armor layer which is disposed between the buffer tube and the jacket of the inner core.

19. The cable claim of 14, wherein the core further comprises at least one longitudinally extending dielectric anti-compression means which is disposed between the buffer tube and the jacket of the inner core.

20. The cable of claim 18, wherein the armor layer constitutes a layer of corrugated bonded steel.

21. The cable of claim 14 further comprising a release coating layer disposed between and in substantial contact with the core jacket and the outer jacket.

22. The cable of claim 21, wherein the release coating layer consists essentially of a release agent and is hydrophobic.

23. The cable of claim 22, wherein the release coating layer is dry and non-tacky.

24. The cable of claim 1, wherein the single strength member unit is a single cylindrical rod.

25. The cable of claim 1, wherein the single strength member unit is at least two longitudinally extending, coupled strength members.

26. The cable claim of claim 1 further comprising at least one strength member disposed about the single strength member unit and wherein the jacket defines a bore in which the single strength member unit and the at least one strength member disposed about the single strength member unit are received.

27. The cable of claim 26, wherein the at least one strength member disposed about the single strength member unit is a longitudinally extending aramid yarn.

28. The cable of claim 24, wherein the rod is made of dielectric material.

29. The cable of claim 1, wherein the single strength member unit includes corrosion resistive material.

30. The cable of claim 1, wherein indicia is disposed at the outer surface of the outer jacket and extending longitudinally along the cable in proximity to the single strength member unit.

31. The cable of claim 30, wherein the indicia comprises a perturbation in the outer surface of the outer jacket.

32. The cable of claim 30, wherein the indicia comprises a colored marking on the outer surface of the outer jacket.

33. An optical fiber cable suitable for aerial installation comprising:
   an inner core comprising:
   a longitudinally extending plastic buffer tube defining a bore loosely receiving at least one optical fiber, wherein the tube includes filling compound in any empty space in the bore;

a plastic jacket surrounding the tube; and a longitudinally extending outer strength member layer disposed between the tube and the core jacket;

an outer jacket enclosing the core jacket and including a single strength member unit embedded within the outerjacket, wherein the single strength member unit extends along a longitudinal axis of the cable parallel to the inner core;

a release coating layer disposed between and in substantial contact with the core jacket and the outer jacket;

wherein a neutral axis $NA_{Min}$ associated with bending of the cable in a plane of minimum bending energy MIN-BP intersects the core and the single strength member unit and is orthogonal to a neutral axis $NA_{Max}$ associated with bending of the cable in a plane of maximum bending energy MAX-BP, wherein the $NA_{Max}$ does not intersect the core; and wherein the single strength member unit is the only element in the cable which can support the weight of the remainder of the cable when longitudinal portions of the outer jacket have been removed to expose respective portions of the single strength member unit and the exposed portions of the single strength member unit have been secured to the spaced supports to support the cable in air.

34. The cable of claim 33, wherein the $NA_{Max}$ does not intersect the bore of the buffer tube.

35. The cable of claim 33, wherein the position of the single strength member unit, the single strength member unit and the shaping of the outer jacket are selected so that bending of the cable in a plane other than the MIN-BP does not require substantially more energy than that required for bending of the cable in the MIN-BP.

36. The cable of claim 33, wherein the position of the single strength member unit, the single strength member unit and the shaping of the outer jacket are selected so that the $NA_{Min}$ intersects the geometric centers of the cable, the core and the single strength member unit.

37. The cable of claim 33, wherein the single strength member unit is a solid cylindrical rod.

38. The cable of claim 33, wherein the single strength member unit is at least two longitudinally extending, coupled strength members.

39. The cable claim of claim 33 further comprising at least one strength member disposed about the single strength member unit and wherein the jacket defines a bore in which the single strength member unit and the at least one strength member disposed about the single strength member unit are received.

40. The cable of claim 39, wherein the at least one strength member disposed about the single strength member unit is a longitudinally extending aramid yarn.

41. The cable of claim 33, wherein the bore loosely contains a plurality of optical fibers arranged in a fiber ribbon stack and having a nominal path at the core axis.

42. The cable of claim 41, wherein the fibers have an excess fiber length (EFL), and the EFL and the cross-sectional area of the bore are selected to minimize stress to the fiber when the cable is subjected to bending in the MAX-BP.

43. The cable of claim 33, wherein the single strength member unit includes corrosion resistive material.

44. The cable of claim 33, wherein the inner core components are more flexible and lighter in weight than the remainder of the cable.

45. An optical fiber cable comprising:

an inner core comprising:
a longitudinally extending plastic buffer tube defining a bore loosely receiving a plurality of optical fiber ribbons arranged in a stack, wherein the tube includes filling compound in any empty space in the bore;
a plastic jacket surrounding the buffer tube; and
at least one longitudinally extending strength member layer disposed between the plastic jacket and the buffer tube; and an outer jacket enclosing the core jacket and including a single strength member unit embedded within the outer jacket, wherein the single strength member unit extends along a longitudinal axis of the cable parallel to the inner core and is the only element in the cable which can support the weight of the cable when the cable is installed in an aerial application secured from spaced vertical poles and wherein the outer jacket is of non-uniform circumferential thickness;

wherein a neutral axis $NA_{Min}$ associated with bending of the cable in a plane of minimum bending energy MIN-BP intersects the core and the single strength member unit and is orthogonal to a neutral axis $NA_{Max}$ associated with bending of the cable in a plane of maximum bending energy MAX-BP;

wherein the $NA_{Max}$ does not intersect the bore; and wherein the position of the single strength member unit, the single strength member unit and the shaping of the shaping of the outer jacket are selected so that the $NA_{Min}$ intersects the geometric centers of the cable, the core and the single strength member unit.

46. The cable of claim 45, wherein the fibers have an excess fiber length (EFL), and the EFL and the cross-sectional area of the bore are selected to minimize stress to the fiber when the cable is subjected to bending in the MAX-BP.

47. The cable of claim 45, wherein the single strength member unit is at least two longitudinally extending, coupled strength members.

48. The cable claim of claim 45 further comprising at least one single strength member disposed about the single strength member unit and wherein the jacket defines a bore in which the single strength member unit and the at least one strength member disposed about the single strength member unit are received.

49. The cable of claim 48, wherein the at least one strength member disposed about the single strength member unit is a longitudinally extending aramid yarn.

50. An optical fiber cable comprising:

a longitudinally extending inner core defining a bore loosely receiving at least one optical fiber;

an outer jacket enclosing the inner core and including a single strength member unit within the outer jacket, wherein the single strength member unit extends along a longitudinal axis of the cable parallel to the inner core;

wherein a neutral axis $NA_{Min}$ associated with bending of the cable in a plane of minimum bending energy MIN-BP intersects the core and the single strength member unit and is orthogonal to a neutral axis $NA_{Max}$ associated with bending of the cable in a plane of maximum bending energy MAX-BP; and wherein the position of the single strength member unit, the single strength member unit and the shaping of the outer jacket are selected so that bending of the cable in a plane other than the MIN-BP does not require substantially more energy than that required for bending of the cable in the MIN-BP.

51. The cable of claim 50, wherein the $NA_{Max}$ is within the outer jacket and does not intersect the core.

52. The cable of claim 51, wherein the $NA_{Max}$ does not intersect the bore of the core.

53. The cable of claim 50, wherein the $NA_{Min}$ intersects the bore of the core and the axis of the single strength member unit.

54. The cable of claim 50, wherein the position of the single strength member unit, the single strength member unit and the shaping of the outer jacket are selected so that the energy required for bending of the cable in the MAX-BP is about 2.7–4.7 times greater than the energy required for bending of the cable in the MIN-BP.

55. The cable of claim 50, wherein the fiber has an excess fiber length (EFL), and the EFL and the cross-sectional area of the bore are selected to minimize stress to the fiber when the cable is subjected to bending.

56. The cable of claim 55, wherein the EFL and the cross-sectional area of the bore are selected to minimize stress to the fiber when the cable is subjected to bending in the MAX-BP.

57. The cable of claim 50, wherein the single strength member unit is at least two longitudinally extending, coupled strength members.

58. The cable claim of claim 57 further comprising at least one single strength member disposed about the single strength member unit and wherein the jacket defines a bore in which the single strength member unit and the at least one strength member disposed about the single strength member unit are received.

59. The cable of claim 58, wherein the at least one strength member disposed about the single strength member unit is a longitudinally extending aramid yarn.

* * * * *

UNITED STATES PATENT AND TRADEMARK OFFICE
CERTIFICATE OF CORRECTION

PATENT NO.   : 6,459,837 B1
DATED        : October 1, 2002
INVENTOR(S)  : Fitz et al.

It is certified that error appears in the above-identified patent and that said Letters Patent is hereby corrected as shown below:

<u>Column 15,</u>
Line 41, "Ah" should read -- ith --;

<u>Column 18,</u>
Line 13, "of" should read -- 64 --;

<u>Column 20,</u>
Line 19, "crises" should read -- comprises --.

Signed and Sealed this

Twenty-seventh Day of January, 2004

JON W. DUDAS
*Acting Director of the United States Patent and Trademark Office*